United States Patent
Goy et al.

(10) Patent No.: US 11,441,973 B2
(45) Date of Patent: Sep. 13, 2022

(54) PUMP HEALTH MONITORING

(71) Applicant: Hamilton Sundstrand Corporation, Charlotte, NC (US)

(72) Inventors: Edward W. Goy, Crystal Lake, IL (US); Charles E. Reuter, Granby, CT (US); Adrian L. Stoicescu, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 154 days.

(21) Appl. No.: 16/798,012

(22) Filed: Feb. 21, 2020

(65) Prior Publication Data

US 2021/0262899 A1  Aug. 26, 2021

(51) Int. Cl.
  *G01M 99/00*  (2011.01)
  *G05B 23/02*  (2006.01)

(52) U.S. Cl.
  CPC ....... *G01M 99/005* (2013.01); *G05B 23/0221* (2013.01)

(58) Field of Classification Search
  CPC .. G01M 99/005; G05B 23/0221; F04B 49/02; F04B 49/065; F04B 2207/70; F04B 2207/703; F04B 51/00
  See application file for complete search history.

(56) References Cited

U.S. PATENT DOCUMENTS

| | | | | |
|---|---|---|---|---|
| 10,982,612 | B1 * | 4/2021 | Carlson | F02D 41/3809 |
| 2004/0030524 | A1 * | 2/2004 | Jarrell | G05B 23/0221 |
| | | | | 702/182 |
| 2015/0064021 | A1 | 3/2015 | Laing | |
| 2017/0030349 | A1 * | 2/2017 | Bassett | F04B 39/10 |
| 2018/0030851 | A1 * | 2/2018 | Emmons | F04D 27/001 |
| 2018/0112656 | A1 * | 4/2018 | Cader | F04B 49/065 |
| 2018/0240322 | A1 * | 8/2018 | Potucek | E04H 4/14 |
| 2019/0195219 | A1 | 6/2019 | Okuno et al. | |
| 2019/0323494 | A1 | 10/2019 | Juul Nielsen et al. | |
| 2020/0340504 | A1 * | 10/2020 | Chung | B64D 41/00 |
| 2020/0370988 | A1 * | 11/2020 | Rogers | E21B 21/08 |

FOREIGN PATENT DOCUMENTS

| | | |
|---|---|---|
| CN | 105466707 A | 4/2016 |
| EP | 3348836 A1 | 7/2018 |
| EP | 3376315 A1 | 9/2018 |
| WO | 2017039682 A1 | 3/2017 |

OTHER PUBLICATIONS

Extended European Search Report Issued in corresponding EP application No. 21158397.6, dated Apr. 15, 2021.

* cited by examiner

*Primary Examiner* — Mohammad K Islam
(74) *Attorney, Agent, or Firm* — Locke Lord LLP; Daniel J. Fiorello; Gabrielle L. Gelozin

(57) ABSTRACT

A method can include receiving, at a control module, first pump characteristic data from a data source associated with a pump, sensing second pump characteristic data from a flow system using one or more sensors, comparing the first pump characteristic data to the second pump characteristic data sensed in the flow system, and determining a health of the pump based on the comparison of the first pump characteristic data to the second pump characteristic data.

15 Claims, 2 Drawing Sheets

PUMP HEALTH MONITORING

FIELD

This disclosure relates to flow systems, more specifically to pump health monitoring.

BACKGROUND

Pumps (e.g., centrifugal, positive displacement, etc.) degrade in their performance over time and can benefit from preventative health monitoring. Pump performance for each pump also vary based upon their initial manufacturing dimensions and other manufacturing tolerances (e.g., motor winding characteristics, surface finishes, part rigidity, etc.).

Such conventional systems have generally been considered satisfactory for their intended purpose. However, there is still a need in the art for pump health monitoring. The present disclosure provides a solution for this need.

SUMMARY

A method can include receiving, at a control module, first pump characteristic data from a data source associated with a pump, sensing second pump characteristic data from a flow system using one or more sensors, comparing the first pump characteristic data to the second pump characteristic data sensed in the flow system, and determining a health of the pump based on the comparison of the first pump characteristic data to the second pump characteristic data.

Receiving the first pump characteristic data can include receiving the first pump characteristic data at start-up and/or initialization of the control module. The method can include storing the first pump characteristic data until shut down or reset of the flow system to allow an update of the first pump characteristic data at each start-up to account for a pump change. In certain embodiments, receiving the first pump characteristic data can include receiving the first pump characteristic data only at start-up and/or initialization of the control module.

The data source can be or can include a digital memory device connected (e.g., wirelessly or wired) to the control module. Receiving the first pump characteristic data can include reading the first pump characteristic data from the digital memory device, e.g., by the control module.

The data source can be or include a pump label. For example, receiving the first pump characteristic data can include receiving scan data from a scanning device operatively connected to the control module.

In certain embodiments, the method can include outputting a health warning signal if the health of the pump is determined to be less than a predetermined threshold. In certain embodiments, the method can include shutting down the pump and/or removing the pump for maintenance and/or replacement if the health of the pump is determined to be degraded below a predetermined threshold. The method can include any other suitable method(s) and/or portion(s) thereof. The method can be embodied as computer executable instructions on a non-transitory computer readable medium such that a computerized device can execute the method, for example.

In accordance with at least one aspect of this disclosure, a system can include a control module for a flow system. The control module can be configured to perform a control module method. The control module method can include any suitable method(s) and/or portion(s) thereof as disclosed herein, e.g., as described above. In certain embodiments, the system can include the pump operatively connected to the control module and having the data source mounted to the pump.

In accordance with at least one aspect of this disclosure, a pump can include a pump housing containing one or more pump components, and a data source mounted on or in the pump housing, the data source comprising first pump characteristic data configured to be read from the data source to provide a control module with the first pump characteristic data. The first pump characteristic data can be standard pump performance data detailing performance when the pump is new, for example. In certain embodiments, the data source can include at least one of a 2D barcode or a 3D barcode disposed on or formed on a surface of the pump housing. Any other suitable data source (e.g., a digital memory) and/or type of first pump characteristic data is contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
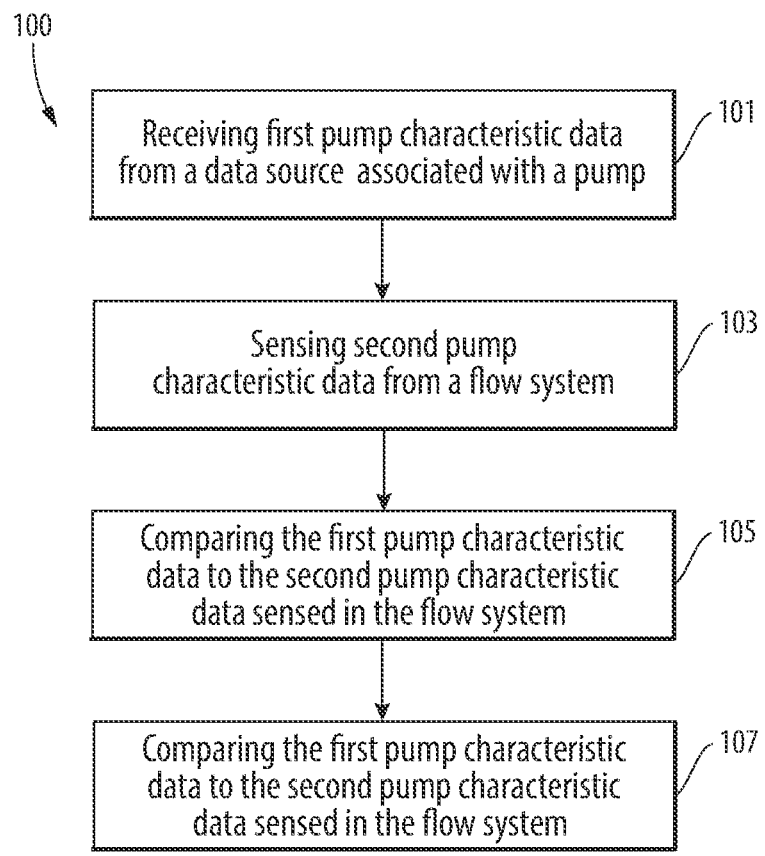
FIG. 1 is a flow diagram of an embodiment of a method in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIGS. 2 and 3.

Figure 2:
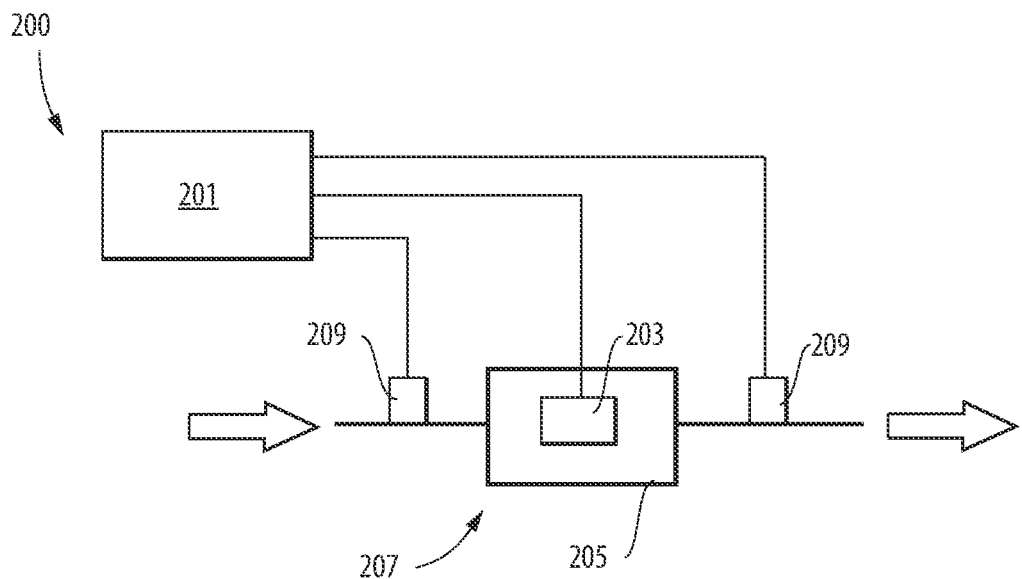
FIG. 2 is a schematic diagram of an embodiment of a system in accordance with this disclosure.
Figure 3:
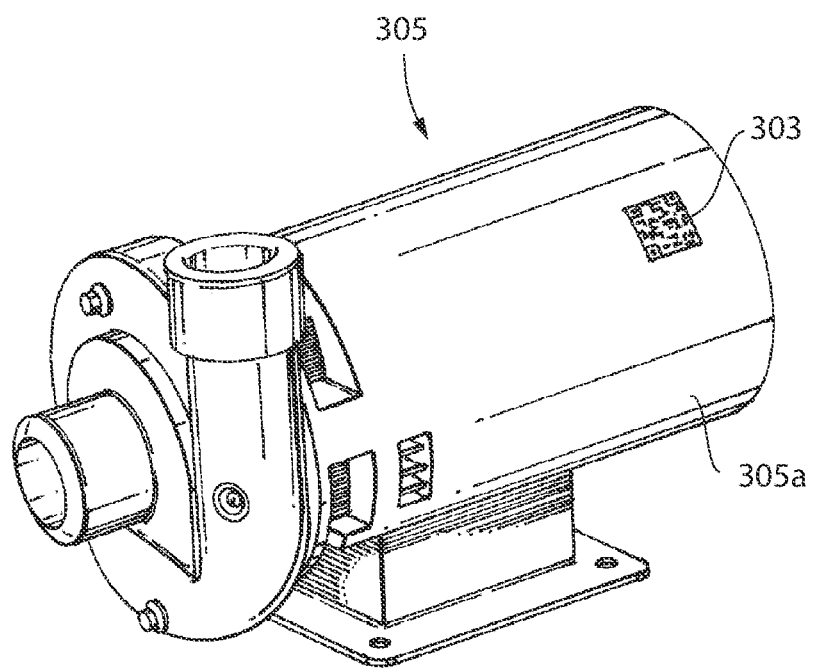
FIG. 3 is a perspective view of an embodiment of a pump in accordance with this disclosure.

Referring to FIG. 1, and additionally to the embodiment of a system 200 of FIG. 2, a method can include receiving (e.g., at block 101), e.g., at a control module 201, first pump characteristic data from a data source 203 associated with a pump 205. The method 100 can include sensing (e.g., at block 103) second pump characteristic data (e.g., actual characteristic data) from a flow system 207 using one or more sensors 209. The one or more sensors 209 can include any suitable type of analog and/or digital senor (e.g., a flow sensor, a pressure sensor, a temperature sensor, a current, voltage, and/or power sensor, etc.) connected to any suitable part of the system (e.g., a flow line, an electrical component of the pump).

The method 100 can include comparing (e.g., at block 105) the first pump characteristic data to the second pump characteristic data sensed in the flow system 200. The method 100 can also include determining (e.g., at block 107) a health of the pump 205 based on the comparison of the first pump characteristic data to the second pump characteristic data.

The first pump characteristic data can include pump performance data, e.g., for when the pump is new. For example the first pump characteristic data can include mass or volumetric flow, flow pressure, and/or flow temperature (e.g., at an inlet and/or outlet of the pump 205) as a function of an input speed command by the control module 201 and/or as a function of a pump operating speed, for example. In certain embodiments, the first pump characteristic data can include one or more electrical characteristics (e.g., electrical power consumption, a current at predetermined voltage, etc.). Any other suitable pump characteristic (e.g., performance) data is contemplated herein. The second pump characteristic data can be the same as the first pump characteristic data, measured from the system 200 using the one or more sensors 209 (e.g., which can be existing flow system sensors). For example, a flow rate and/or pressure at an outlet of the pump 205 can be measured and compared to a flow rate and/or pressure of the first pump characteristic data corresponding to the operating conditions (e.g., speed) of the pump 205. Sensing and/or comparison can be continuous, periodic, or otherwise caused to occur in any suitable manner or timing (e.g., only at start up).

Receiving the first pump characteristic data can include receiving the first pump characteristic data at start-up and/or initialization of the control module 201. The method 100 can include storing the first pump characteristic data until shut down or reset of the flow system to allow an update of the first pump characteristic data at each start-up to account for a pump change, for example. In certain embodiments, receiving the first pump characteristic data can include receiving the first pump characteristic data only at start-up and/or initialization of the control module 201, for example. Any other suitable timing is contemplated herein. For example, in certain embodiments the first pump characteristic data may only be read or otherwise input to the control module (e.g., scanned in from a bar code) once when the pump is replaced.

The data source 203 can be or can include a digital memory device (e.g., a hard drive, a removable memory, any suitable non-transitory computer readable medium, etc.) connected (e.g., wirelessly or wired) to the control module 201. Receiving the first pump characteristic data can include reading the first pump characteristic data from the digital memory device, e.g., by the control module 201.

In certain embodiments, the data source 203 can be or include a pump label. For example, receiving the first pump characteristic data can include receiving scan data from a scanning device operatively connected to the control module 201 (e.g., wirelessly or wired). Any combination of types of data sources 203 are contemplated herein.

In certain embodiments, the method 100 can include outputting a health warning signal if the health of the pump 205 is determined to be less than a predetermined threshold (e.g., the values of the second pump characteristic data deviate from the values of the first pump characteristic data by a selected amount). In certain embodiments, the method 100 can include shutting down the pump and/or removing the pump for maintenance and/or replacement 205 if the health of the pump is determined to be degraded below a predetermined performance threshold. In certain embodiments, health monitoring can be done to recognize pump degradation before the pump degrades to where it has to be shutdown or before it degrades to where it is no longer able to perform its function, for example. In this regard, maintenance can be scheduled at a convenient time with minimal interruption to the pumps performance. Any combination of outputs is contemplated herein.

The method can include any other suitable method(s) and/or portion(s) thereof. The method can be embodied as computer executable instructions on a non-transitory computer readable medium such that a computerized device can execute the method, for example.

In accordance with at least one aspect of this disclosure, a system 200 can include a control module 201 for a flow system 207. The control module 201 can be configured to perform a control module method. The control module method can include any suitable method(s) and/or portion(s) thereof as disclosed herein, e.g., as described above. In certain embodiments, the system 200 can include the pump 205 operatively connected to the control module 201 and having the data source 203 mounted to the pump 205. The control module 201 can include any suitable hardware and/or software module(s).

The control module 201 can be a dedicated pump control module, or any other suitable module (e.g., an engine control module for controlling fuel flow with the pump). In this regard, the pump 205 can be for any suitable application (e.g., a fuel pump).

Referring additionally to FIG. 3, in accordance with at least one aspect of this disclosure, a pump 305 can include a pump housing 305a containing one or more pump components (not shown; e.g., a centrifugal impeller or positive displacement pump such as a gear pump, a motor, etc.) and a data source 303 mounted on or in the pump housing 305a. The pump 305 (and/or pump 205) can be any suitable type of pump, e.g., a centrifugal pump or a positive displacement pump. Certain embodiments of a pump can be driven by an electric motor, or can be otherwise driven. For example, certain embodiments can be a fuel pump (e.g., for a gas turbine engine) driven by the engine through a gearbox, and the pump can spin in proportion to rotor speed. In this regard, the first pump characteristic data can include a correlation between engine speed and performance characteristics (e.g., pressure, flow rate upstream and/or downstream, etc.). The control module 201 can compare the actual pump performance at a rotational speed, for example, to determine if the actual pump performance is within a predetermined range of performance criteria.

The data source 303 can at least include first pump characteristic data configured to be read from the data source 303 to provide a control module 201 with the first pump characteristic data. The first pump characteristic data can be standard pump performance data detailing performance when the pump is new, for example. In certain embodiments, e.g., as shown, the data source 303 can include at least one of a 2D barcode or a 3D barcode disposed on or formed on a surface (e.g., an outside surface, a pump face, an interior accessible surface) of the pump housing 305a. Any other suitable data source (e.g., a digital memory) and/or type of first pump characteristic data is contemplated herein.

In accordance with certain embodiments disclosed herein, pump specific performance characteristics identified, e.g., by original equipment manufacturer (OEM) testing can be stored on a suitable data storage medium (e.g., a USB type memory device) attached to the pump, on a 3D name plate attached to the pump, or in any other suitable storage medium attached to the pump. Such characteristics can provide a control module (e.g., an engine controller such as a FADEC/EEC) with pump performance data which can allow for monitoring of the pump for degradation to provide preventative health monitoring, for example. Characterization and storage of the specific operating characteristics on the pump and/or the engine controller can allow for preventative health monitoring of the pump and removal prior to a failure. Onboard storage or ID plate printing of performance characteristics specific to each pump can aid the electronic fuel controls or electronic engine controller to monitor the pump's performance over time and establish criteria for removal of the pump prior to its failure, for example.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A non-transitory computer readable medium comprising computer executable instructions to cause a computerized device to perform a method, the method comprising:
   receiving, at a control module, first pump characteristic data from a data source associated with a pump;
   sensing actual first pump characteristic data from a flow system using one or more sensors;
   comparing the first pump characteristic data to second pump characteristic data;
   determining a health of the pump based on the comparison of the first pump characteristic data to the second pump characteristic data; and
   storing the first pump characteristic data until shut down or reset of the flow system to allow an update of the first pump characteristic data at each start-up;
   wherein receiving the first pump characteristic data includes receiving the first pump characteristic data at start-up and/or initialization of the control module, wherein receiving the first pump characteristic data includes receiving the first pump characteristic data only at start-up and/or initialization of the control module.

2. The non-transitory computer readable medium of claim 1, wherein the data source is or includes a digital memory device connected to the control module, wherein receiving the first pump characteristic data includes reading the first pump characteristic data from the digital memory device.

3. The non-transitory computer readable medium of claim 1, wherein the data source is or includes a pump label, wherein receiving the first pump characteristic data includes receiving scan data from a scanning device operatively connected to the control module.

4. The non-transitory computer readable medium of claim 1, wherein the method further comprises outputting a health warning signal if the health of the pump is determined to be less than a predetermined threshold.

5. The non-transitory computer readable medium of claim 1, wherein the method further comprises shutting down the pump and/or removing the pump for maintenance and/or replacement if the health of the pump is determined to be degraded below a predetermined threshold.

6. A system, comprising:
   a control module for a flow system, the control module configured to perform a control module method, the control module method comprising:
   receiving first pump characteristic data from a data source associated with a pump, wherein receiving the first pump characteristic data includes receiving the first pump characteristic data at start-up and/or initialization of the control module;
   sensing second pump characteristic data from a flow system using one or more sensors;
   comparing the first pump characteristic data to the second pump characteristic data sensed in the flow system;
   determining a health of the pump based on the comparison of the first pump characteristic data to the second pump characteristic data; and
   storing the first pump characteristic data until shut down or reset of the flow system to allow an update of the first pump characteristic data at each start-up.

7. The system of claim 6, wherein receiving the first pump characteristic data includes receiving the first pump characteristic data only at start-up and/or initialization of the control module.

8. The system of claim 6, wherein the data source is or include a digital memory device connected wirelessly or wired to the control module, wherein receiving the first pump characteristic data includes reading the first pump characteristic data from the digital memory device.

9. The system of claim 6, wherein the data source is or includes a pump label, wherein receiving the first pump characteristic data includes receiving scan data from a scanning device operatively connected to the control module.

10. The system of claim 6, wherein the control module method includes outputting a health warning signal if the health of the pump is determined to be less than a predetermined threshold.

11. The system of claim 6, wherein the control module method further comprising shutting down the pump and/or removing the pump for maintenance and/or replacement if the health of the pump is determined to be degraded below a predetermined threshold.

12. The system of claim 11, further comprising the pump operatively connected to the control module and having the data source mounted to the pump.

13. A pump, comprising:
   a pump housing containing one or more pump components; and
   a data source mounted on or in the pump housing, the data source comprising first pump characteristic data configured to be read from the data source to provide a control module with the first pump characteristic data at start-up and/or initialization of the control module, wherein the control module is configured to store the first pump characteristic data until shut down or reset of the flow system to allow an update of the first pump characteristic data at each start-up.

14. The pump of claim 13, wherein the first pump characteristic data is pump performance data detailing pump performance when the pump is new.

15. The pump of claim 14, wherein the data source includes at least one of a 2D barcode or a 3D barcode disposed on or formed on a surface of the pump housing.

* * * * *